United States Patent [19]
Miki et al.

[11] 3,911,137
[45] Oct. 7, 1975

[54] PROCESS FOR PREPARING HIGHLY CONCENTRATED AQUEOUS SOLUTION OF A DOPA COMPOUND

[75] Inventors: Tomonori Miki, Fujimi; Seiji Tanaka, Koganei, both of Japan

[73] Assignee: Sankyo Company Limited, Tokyo, Japan

[22] Filed: Nov. 27, 1973

[21] Appl. No.: 419,392

[30] Foreign Application Priority Data
Dec. 11, 1972  Japan................................ 47-124158

[52] U.S. Cl. ............................................... 424/319
[51] Int. Cl.² ......................................... A61K 31/195
[58] Field of Search ..................................... 424/319

[56] References Cited
UNITED STATES PATENTS
3,701,829  10/1972  Bartholini ........................... 424/319
3,729,563  4/1973  Cash et al. ........................... 424/308
3,790,674  2/1974  Rodriguez ............................ 424/250

OTHER PUBLICATIONS

Husa's Pharmaceutical Dispensing, Martin, 6th Ed., (1966), pp. 211–213 and 671.

Chem. Abst. 76, 49942(s), (1972).

Primary Examiner—Stanley J. Friedman
Attorney, Agent, or Firm—Flynn & Frishauf

[57] ABSTRACT

A highly concentrated aqueous solution of a dopa or tyrosine can be prepared by adding at least one water-soluble high molecular weight substance selected from the group consisting of methyl cellulose, hydroxypropyl cellulose, hydroxypropylmethyl cellulose or gelatine to a dopa or tyrosine.

12 Claims, No Drawings

PROCESS FOR PREPARING HIGHLY CONCENTRATED AQUEOUS SOLUTION OF A DOPA COMPOUND

The present invention relates to a process for preparing a highly concentrated aqueous solution of a dopa compound (a dopa or tyrosine).

Typical examples of a dopa include dopa [3-(3,4-dihydroxyphenyl)-L-alanine] and methyldopa [L-3-(3,4-dihydroxyphenyl)-2-methylalanine]. The former is known as a remedy for Parkinson's disease and the latter is known as a hypotensive drug. Also, tyrosine is one of the essential amino acids and is an important substance as a precursor for epinephrine or a thyroid hormone (thyroxine).

However, these substances are inconvenient to use as an injection owing to their low water-solubility. For example, the water-solubility of dopa is about 2.5 mg/ml and 20 ml of water is required for producing a preparation containing 50 mg of dopa as a dose. Therefore, a large ampoule is used but it is inconvenient to use.

Under the circumstances, a high concentration preparation of these medicines has been demanded clinically. However, no preparation satisfying such a requirement has appeared.

An object of the present invention is to provide a highly concentrated aqueous solution of a dopa or tyrosine.

Another object of the present invention is to provide a process for preparing such a highly concentrated aqueous solution of a dopa or tyrosine.

Other objects and a full understanding of the invention may be had by referring to the following description and claims.

As a result of the present inventors' studies on the high concentration dissolution of the above-mentioned medicines, it has now been found that a dopa or tyrosine can be dissolved in a high concentration by the addition of certain water-soluble high molecular weight substances. The present invention has been completed based on this finding.

According to the process of the present invention, a highly concentrated aqueous solution of a dopa or tyrosine can be prepared by adding at least one water-soluble high molecular weight substance selected from the group consisting of methyl cellulose, hydroxypropyl cellulose, hydroxypropylmethyl cellulose and gelatine to the dopa or tyrosine.

By this procedure, dopas or tyrosine can be dissolved in water in a concentration of 4-5 times their water-solubility.

The mechanism of the solubility-enhancing action of the above-mentioned high molecular weight substances for dopas or tyrosine is not clear, but can be explained as follows:

Even if dopas and tyrosine are dissolved in a high concentration by heating or pH adjustment, dopas and tyrosine form an intermolecular hydrogen bond, break hydration and are separated as crystals when the conditions are returned to original ones. Here, if a water-soluble high molecular weight substance such as methyl cellulose, hydroxypropyl cellulose, hydroxypropylmethyl cellulose or gelatine is added, the —OH group or —COOH group of dopas or tyrosine is caught by these high molecules and a metastable highly concentrated solution is obtained.

In order to carry out the process of the present invention, it is preferable that a dopa or tyrosine is previously dissolved in a high concentration by heating or pH adjustment and a solution of at least one of the above-mentioned high molecular weight substances is then added to the resulting solution. An amount of the high molecular weight substances is not critical, but it is preferable that the high molecular weight substances are added so that the concentration of the substances in the final solution may be 0.05-1.0 w/v %, since the addition of a large amount of the substances causes evils such as an increase in viscosity in pharmaceutical manufacturing procedure. Also, the use of a mixture of two or more of these high molecular weight substances gives a good result.

The following examples illustrate the process of the present invention in more detail.

EXAMPLE 1

400 mg of sodium bisulfite and 100 mg of disodium ethylenediaminetetraacetate were dissolved in 20 ml of water for injection. One gram of dopa was added to the resulting solution and an aqueous sodium hydroxide solution was added dropwise to dissolve dopa. To the resulting aqueous dopa solution was added a solution of 100 mg of methyl cellulose (SM-10) in 30 ml of water for injection with stirring. The pH of the mixture was adjusted to 9 by the use of an aqueous sodium hydroxide solution. The mixture was made up to 100 ml with water for injection and heated at 80°C for 10 minutes to obtain a highly concentrated aqueous solution containing 10 mg/ml of dopa (the water-solubility of dopa 2.5 mg/ml).

EXAMPLE 2

The same procedure as in Example 1 was repeated except that 100 mg of methyl cellulose was replaced by 500 mg of hydroxypropyl cellulose. Thus, a highly concentrated aqueous solution containing 10 mg/ml of dopa was obtained.

EXAMPLE 3

The same procedure as in Example 1 was repeated except that 100 mg of methyl cellulose was replaced by 500 mg of hydroxypropylmethyl cellulose. Thus, a highly concentrated aqueous solution containing 10 mg/ml of dopa was obtained.

EXAMPLE 4

The same procedure as in Example 1 was repeated except that 100 mg of methyl cellulose was replaced by 20 mg of gelatine (isoelectric point 9). Thus, a highly concentrated aqueous solution containing 10 mg/ml of dopa was obtained.

Even if the highly concentrated aqueous solution of dopa obtained in each of the above-mentioned examples was allowed to stand at 0°C for two weeks, the solution was stable and the separation of crystals was not observed in every case.

What is claimed is:

1. A process for increasing the solubility of dopa, methyldopa or tyrosine in water, which comprises incorporating in an aqueous solution of dopa, methyldopa or tyrosine a high molecular weight substance selected from the group consisting of methylcellulose, hydroxypropyl cellulose, hydroxypropylmethyl cellulose and gelatine.

2. The process of claim 1, wherein said high molecular weight substance is incorporated in said concentrated aqueous solution in an amount to provide from 0.05 to 1.0 percent of said substance in said stable solution.

3. The process of claim 1, wherein said dopa, methyldopa or tyrosine is dissolved in water by heating or pH adjustment thereof.

4. The process of claim 1, wherein dopa is present in said stable concentrated aqueous solution.

5. The process of claim 1, wherein tyrosine is present in said stable concentrated aqueous solution.

6. The process of claim 1, wherein the pH of the resulting solution containing said high molecular weight solution is adjusted to about 9 with an aqueous sodium hydroxide solution, and the resulting mixture is heated at about 80°C.

7. A process for preparing a stable concentrated aqueous solution of dopa, methyldopa or tyrosine, which comprises dissolving dopa, methyldopa or tyrosine in water to form a concentrated aqueous solution thereof, and incorporating in said concentrated solution a high molecular weight substance selected from the group consisting of methyl cellulose, hydroxypropyl cellulose, hydroxypropylmethyl cellulose and gelatine.

8. A stable concentrated aqueous solution of dopa, methyldopa or tyrosine, and a high molecular weight substance selected from the group consisting of methyl cellulose, hydroxypropyl cellulose, hydroxypropylmethyl cellulose and gelatine, said solution having a concentration of said high molecular weight substance of from 0.05 to 1.0 w/v percent.

9. A solution of claim 8, wherein a dopa or tyrosine is present in an amount of 10 mg. per ml. of solution.

10. A solution of claim 8, wherein dopa is present therein.

11. A solution of claim 8, wherein tyrosine is present therein.

12. A solution of claim 8, wherein the high molecular weight substance is gelatine having an isoelectric point of 9.

* * * * *